United States Patent
Lin

(10) Patent No.: US 9,875,113 B2
(45) Date of Patent: Jan. 23, 2018

(54) SYSTEM AND METHOD FOR MANAGING BIOS SETTING CONFIGURATIONS

(71) Applicant: Quanta Computer Inc., Taoyuan (TW)

(72) Inventor: Yu-Han Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/963,875

(22) Filed: Dec. 9, 2015

(65) Prior Publication Data

US 2017/0168851 A1  Jun. 15, 2017

(51) Int. Cl.
G06F 1/00 (2006.01)
G06F 9/44 (2006.01)
G06F 21/44 (2013.01)

(52) U.S. Cl.
CPC .......... G06F 9/4411 (2013.01); G06F 9/4406 (2013.01); G06F 21/44 (2013.01)

(58) Field of Classification Search
CPC ....... G06F 9/4411; G06F 9/4406; G06F 21/44
USPC ...... 726/4, 30, 18, 1, 19; 713/193, 155, 166, 713/1, 2; 455/420
See application file for complete search history.

(56) References Cited

U.S. PATENT DOCUMENTS

| | | | |
|---|---|---|---|
| 5,586,301 A | 12/1996 | Fisherman et al. | |
| 2005/0283599 A1* | 12/2005 | Zimmerman | G06F 9/4403 713/2 |
| 2006/0184794 A1* | 8/2006 | Desselle | G06F 21/575 713/166 |
| 2008/0022367 A1* | 1/2008 | Dailey | G06F 21/32 726/4 |
| 2008/0098156 A1 | 4/2008 | Shen et al. | |
| 2010/0088499 A1* | 4/2010 | Zimmer | G06F 21/10 713/2 |
| 2010/0169640 A1* | 7/2010 | Smith | G06F 21/335 713/155 |
| 2010/0169669 A1* | 7/2010 | Smith | G06F 21/6218 713/193 |
| 2011/0113181 A1* | 5/2011 | Piwonka | G06F 8/65 711/102 |

(Continued)

FOREIGN PATENT DOCUMENTS

TW  201250592 A1  12/2012
TW  I436280 B  5/2014

OTHER PUBLICATIONS

Taiwanese Office Action for Application No. 105111017, dated Apr. 10, 2017, w/ First Office Action Summary.

(Continued)

*Primary Examiner* — Aurel Prifti
(74) *Attorney, Agent, or Firm* — Nixon Peabody LLP; Eduardo J. Quinones; Zhou Lu

(57) ABSTRACT

A BIOS settings configuration may be stored in BIOS of a computer system. A default BIOS status may be set as a locked state. The BIOS status can be changed from the locked state to an unlocked state when an authentication request is received and when the received authentication information matches stored authentication information in BIOS. In some embodiments, a BIOS settings change request can be received. The BIOS settings can be modified based on the BIOS settings change request. The BIOS status can be changed back to the locked state after the BIOS settings modification has been made.

20 Claims, 4 Drawing Sheets

(56) References Cited

U.S. PATENT DOCUMENTS

| | | | | |
|---|---|---|---|---|
| 2011/0138166 A1* | 6/2011 | Peszek | G06F 21/575 | 713/2 |
| 2013/0019281 A1* | 1/2013 | Jacobs | G06F 21/575 | 726/4 |
| 2013/0174250 A1* | 7/2013 | Chen | G06F 21/572 | 726/18 |
| 2013/0318216 A1* | 11/2013 | Sakamaki | H04L 41/0813 | 709/221 |
| 2014/0099361 A1* | 4/2014 | Krishnamurthy | A61K 9/167 | 424/456 |
| 2014/0230078 A1* | 8/2014 | Graham | G06F 21/572 | 726/30 |
| 2015/0047022 A1* | 2/2015 | von der Lippe | G06F 21/31 | 726/19 |
| 2015/0071677 A1* | 3/2015 | Hirasawa | G03G 21/206 | 399/94 |
| 2015/0302200 A1* | 10/2015 | Tonry | G06F 21/57 | 713/1 |
| 2016/0036628 A1* | 2/2016 | Gupta | H04W 4/005 | 455/420 |
| 2016/0162689 A1* | 6/2016 | Martinez | G06F 9/4401 | 726/1 |
| 2017/0262352 A1* | 9/2017 | Jeansonne | G06F 11/302 | |

OTHER PUBLICATIONS

Taiwanese Search Report for Application No. 105111017, dated Apr. 10, 2017.

* cited by examiner

SYSTEM AND METHOD FOR MANAGING BIOS SETTING CONFIGURATIONS

FIELD OF THE INVENTION

This application relates to a server device, and more particularly to a method of managing Basic Input/Output System (BIOS) setting configurations for a computing device.

BACKGROUND

A number of techniques have been developed to remotely manage the operation of computer servers in a manner that provides accessibility, consistency, and efficiency. Remote management allows the removal of input/output interfaces (e.g., monitors, keyboards, and mice) for the servers. For example, large data centers containing numerous servers that are commonly managed using a variety of remote management tools, such as simple terminal connections, remote desktop applications, and other software tools for configuring, monitoring, and troubleshooting server hardware and software.

In a typical computer system (e.g., a rack server in a data center) a BIOS software program is stored on a BIOS chip located on a motherboard of the computer system. The BIOS stores firmware executed by a central processing unit (CPU) of the computer system, prior to loading the operating system, when the computer system is first powered on along with a set of configurations specified for the BIOS. The BIOS firmware and BIOS configurations are typically stored in a non-volatile memory such as a non-volatile random-access memory (NVRAM) or a read-only memory (ROM). Based on the BIOS, the CPU will then execute a series of tasks to recognize, initialize, and test hardware present in the computing system based on the set of configurations. The BIOS then allows the CPU of the computer system to load an operating system (OS).

The BIOS software provides an interface that allows a variety of different parameters to be set. For example, the interface may be used to specify clock and bus speeds, specify what peripherals are attached to the computer system, specify monitoring of health (e.g., fan speeds and CPU temperature limits), and specify a variety of other parameters that affect overall performance and power usage of the computer system.

Servers may be used by different data centers with different computing needs. However, typical servers are pre-loaded with a single BIOS default configuration that may not be optimal for the differing needs of the customers. In addition, BIOS configurations for servers are often complicated and may be closely tied to hardware combinations in each rack server. Traditionally, the administrator needs a human-to-machine interface and an OS application to change the BIOS configurations for rack servers, which limits the initial configuration of the rack servers.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for managing Basic Input/Output System (BIOS) configurations for a computer system. In an aspect, a method is provided for managing BIOS configurations for a computer system. The method includes receiving a change request to modify the BIOS setting. The method includes determining whether the BIOS status is an unlocked state, and based on the determination, modifying the BIOS based on the change request.

In a related aspect, the method further includes determining whether the BIOS status is a locked state. The method further includes receiving an authentication request to change from the locked state to the unlocked state, where the received authentication request includes authentication information. The received authentication information is compared with stored authentication information stored in the BIOS for matching. Upon determining whether the received authentication information matches the stored authentication information, the BIOS status can be changed to the unlocked state. The method further includes modifying the BIOS settings based on the change request. After the modification has been made, the BIOS settings can be changed from the unlocked state back to the locked state.

In another aspect, an apparatus is provided for managing BIOS configurations for a computer system. The apparatus includes at least one processor configured for receiving a change request to modify the BIOS setting, determining a BIOS status, receiving an authentication request which includes authentication information, determining whether the received authentication information matches stored authentication information stored in the BIOS, and changing the BIOS status from the locked state to the unlocked state.

In yet another aspect, a non-transitory computer-readable medium is provided for managing BIOS configurations for a computer system. The non-transitory computer-readable medium stores executable instructions which cause a data processing device to receive a change request to modify the BIOS setting, determine a BIOS status, receive the authentication request which includes authentication information, determine that the received authentication information matches stored authentication information stored in the BIOS, and changing the BIOS status from the locked state to the unlocked state.

BRIEF DESCRIPTION OF THE DRAWINGS

These and other sample aspects of the present technology will be described in the detailed description and the appended claims that follow, and in the accompanying drawings, wherein:

DETAILED DESCRIPTION

Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

The subject disclosure provides techniques for managing BIOS settings configurations in accordance with the present technology. A BIOS of a computer system (e.g., a rack server) can be loaded with a BIOS default configuration. The computer system can start up using a BIOS default configurations or can instead start up with a custom BIOS settings configuration specified by a user (e.g., an administrator).

Figure 1A:
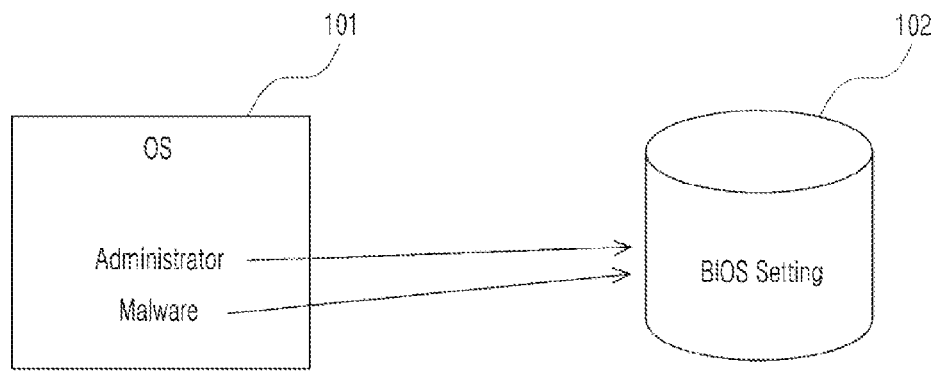
FIGS. 1A, 1B, and 1C illustrate a block diagrams that are useful for understanding various aspects of the present technology.

The disclosure turns first to FIG. 1A, which illustrates a traditional method of accessing the BIOS settings and the problems associated therewith. In particular, FIG. 1A illustrates a configuration where access to BIOS settings 102 provided to any processes currently running under the Operating System (OS) 101. Typically, an administrator, or other authorized user, can usually have access to the BIOS settings 102 to modify them as needed. However, the problem with this situation is that malware may also have access to the BIOS settings 102 through the Operating System 101. As used herein, the term "malware" refers to any type of malicious software, such as viruses. Thus, in the configuration of In FIG. 1A, not only may authorized users of the computing system (e.g. administrator) have access to the BIOS settings 102, but also the malware can have access to the BIOS settings 102. This can cause harm to the computer system.

Figure 1B:
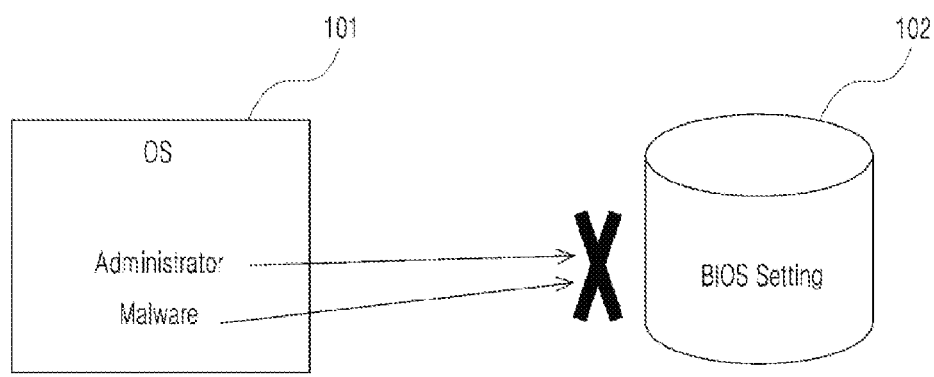

One proposed solution has been to simply prevent access to the BIOS settings. This is illustrated in FIG. 1B. FIG. 1B illustrates a situation where BIOS access permission is denied to any processes from Operating System 101 requesting to gain access to prevent unauthorized access. These settings override BIOS access permissions, and can prevent not only the malicious malware, but also legitimate users of the computer system from accessing the BIOS settings 102. Therefore, the administrator may not be able to modify the BIOS settings 102 when needed, such as via a remote access via the Operating System 101. This can be especially inconvenient when the administrator needs to manage thousands of computer systems, such as in a data center. Moreover, this can also affect security of the computer system. For example, if modification of some security features of the computer system through BIOS settings 102 is needed, the inconvenience of limited access may delay updates and leave the computer system vulnerable. Additionally, if modification of some other features of the computer system through BIOS settings 102 is needed to support new functionality, the inconvenience of limited access may delay updates and deployment of such new features.

Figure 1C:
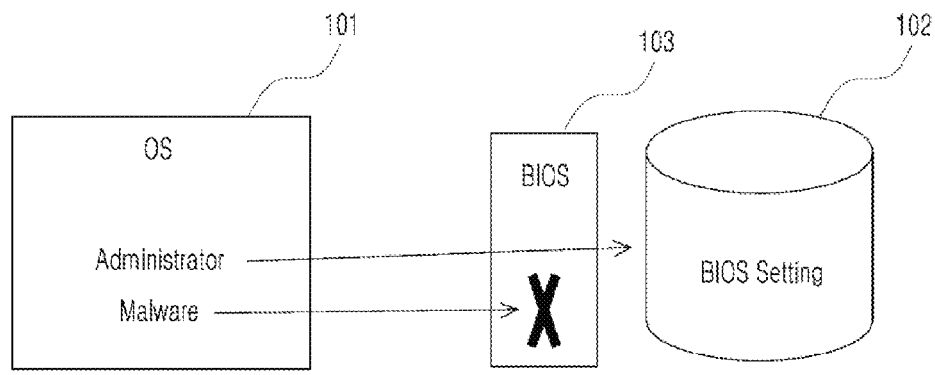

In view of the foregoing, the present disclosure provides a new methodology for managing BIOS updates. This is illustrated in FIG. 1C. In particular, FIG. 1C illustrates a method of accessing the BIOS settings 102 through a BIOS authentication mechanism 103. That is, the BIOS authentication mechanism 103 is configured to allow a process at the Operating System 101 (e.g., an administrator controlled process) to modify the BIOS settings 102 when valid authentication information is provided. In particular, by "unlocking" the BIOS setting 102. Therefore, to manage the BIOS setting, the administrator will need to have accurate authentication information which will be matched with internal authentication information stored in the BIOS or other secure information.

The present disclosure contemplates that the BIOS authentication mechanism 103 can be any authorization mechanism to confirm the credentials of authorized user who can have access to the BIOS setting. Such a mechanism can operate internal or external to the Operating System 101. Further such a mechanism can operate on the CPU of the computer system or and other controller of the computer system, such as a management controller. For example, in some embodiments, the management controller (e.g. Baseboard management controller (BMC)) is configured to work with the central processing unit (CPU) to provide the BIOS authentication mechanism to allow the processes in the Operating System 101 at CPU access to the BIOS.

The present disclosure also contemplates that a similar process can be utilized to manage and control the BIOS settings. 102. In such a configuration the management controller can stand between the CPU and the BIOS to allow the BIOS a remote out-of-band process to determine whether the received authentication information is correct. BIOS may get the stored authentication information from BMC. BMC may be the owner to control the definition of correct authentication information. In some embodiments, BMC may control and store the BIOS setting (e.g. locked state/unlocked state), and BIOS may check the current state from BMC while receiving BIOS setting change requirement from OS. The BIOS authentication mechanism 103 can be configured to manage authentication processes using different types of authentication. Such information can include passwords, biometric information, identification (ID) process, cryptography methods, digital signature, remote control, or any combinations thereof. This list of authentication processes for BIOS authentication mechanism 103 is not an exclusive list and there could be other ways of authentication. It should be understood that the examples provided are not exhaustive and do not limit the authentication process to the precise forms disclosed.

Figure 2:
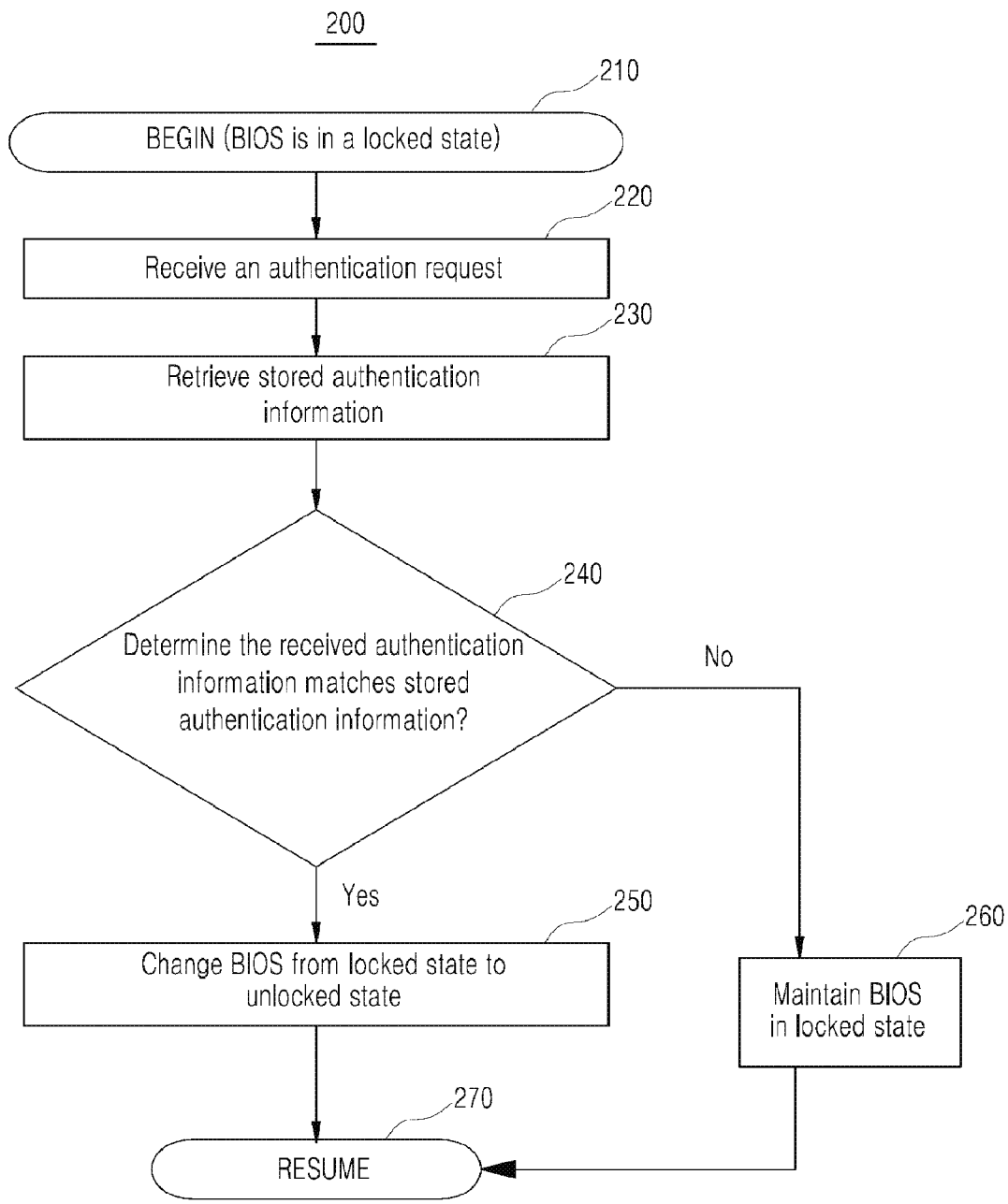
FIG. 2 illustrates a flow chart of an exemplary method of authentication process for the BIOS settings configurations in a computer system.

In accordance with one or more aspects of the implementations described herein, FIG. 2 illustrates a flow chart of an exemplary method of the authentication process for the unlocking BIOS settings in a computer system. The method 200 can start at step 210 when the BIOS settings are in a locked state. The present disclosure contemplates that the locked state can be a default BIOS state to prevent unauthorized entities from accessing the BIOS settings. Such default BIOS settings may be specified by a user (e.g. administrator). In some embodiments, such state indication can be stored in System Management Random Access Memory (SMRAM).

At step 220, the BIOS authentication mechanism can receive an authentication request. The authentication request can be a BIOS state change request to change the BIOS status from the locked state to the unlocked state to make necessary BIOS settings modification. The authentication request can be received from the administrator through OS application software. The authentication request can include authentication information for verification of the status change request. The authentication information includes any authentication process information such as authentication password, biometric information, identification (ID) process, cryptography methods, digital signature, remote control, etc. The list of BIOS authentication process described above is not an exclusive list and there could be other ways of authentication.

In some embodiments, for example, the authentication information can be biometric information received by the peripheral devices of the computing system. In some embodiments, for example, the authentication information can be audio visual content information detected by various sensors of the computing system. In some embodiments, for example, the authentication information can be password comprised of string variables generated or customized by the computer system.

At step 230, the BIOS authentication mechanism can retrieve stored authentication information. In some embodiments, for example, an authentication password can be stored in System Management Random Access Memory (SMRAM) and the BIOS authentication mechanism can retrieve the password from the SMRAM. However, in other embodiments, to further secure the password, only BIOS software code running in a System Management Mode (SMM) can be permitted access to the password stored in SMRAM. Thus, any other software running in a normal mode in the Operating System may not have access to any data in the SMRAM. Thus, the password can be safely protected.

At step 240, the stored authentication information and the received authentication information from the administrator can be compared to make a determination whether the received authentication information matches with the stored authentication information.

The present disclosure contemplates that the authentication information from the administrator received at step 220 or the authentication information retrieved at step 230 may be encrypted. Accordingly, the present disclosure contemplates that any of steps 220, 230, and 240 may involve decryption processes.

In some embodiments, the BIOS authentication mechanism is configured to determine at step 240 whether or not the received authentication information exactly matches with the stored authentication information. However, in other embodiments, BIOS authentication mechanism is configured to determine at step 240 a level of similarity between the received authentication information and the stored authentication information. The level of similarity indicates how much the received authentication information is similar to the stored authentication information. In such configurations the BIOS authentication mechanism may determine that the received authentication information matches the stored authentication information if the level of similarity is above a threshold level of similarity in order to determine that the received authentication information matches the stored authentication information.

In some embodiments, the threshold level of similarity can be determined by the computing system. For example, the types of input devices may limit the reproducibility of the authentication information and thus threshold can be adjusted based on the types of input device detected. Similarly, the type of authentication information may require an adjustment of the threshold. For example, biometric information may require a lower threshold than a text-based password. In still other embodiments, the threshold level of similarity can be customized by the user.

At step 250, upon determining that the received authentication information matches the stored authentication information at step 240, the BIOS status can be changed from the locked state to the unlocked state to allow any necessary BIOS settings changes. Alternatively At step 260, upon determining that the received authentication information does not match the stored authentication information at step 240, the BIOS status is maintained in the locked state. Thus, access to the BIOS settings is blocked. Thereafter, the BIOS mechanism can resume previous processing at step 270, including repeating method 200.

In some embodiments, Unified Extensible Firmware Interface (UEFI) BIOS settings can be stored in a BIOS memory device (e.g. flash) in NVRAM as an Extensible Firmware Interface (EFI) Variable. In some embodiments, for example, the authentication password can be stored in NVRAM as an Extensible Firmware Interface (EFI) Variable. The password can be stored in NVRAM without setting runtime accessible indication flag, so the password can be readable while the computer system is rebooted or shutdown.

In a related aspect, the BIOS authentication mechanism enables the BIOS settings change during runtime. For example, the EFI Variable can be runtime accessible. By implementing the BIOS authentication mechanism, a runtime accessible indication flag for the EFI Variable can be added to accept the BIOS settings change request under the normal OS. This feature enables the BIOS software code running in SMM to access the BIOS setting and prevents the malware operating in a normal mode in the OS from accessing the BIOS setting.

When the BIOS status change request is received, the BIOS will check the BIOS status to make sure if the BIOS status change request can be acceptable. Upon determining that the BIOS status needs to be changed to accept the change request (e.g. the BIOS status is a locked state), the BIOS can modify the SetVariable ( ) service implementation in SMM. To change the EFI Variable related to the BIOS setting, the BIOS can change the EFI Variable stored in NVRAM.

In some embodiments, for example, the BIOS can call EFI SetVariable ( ) Service with a pre-defined EFI Variable name input when this pre-defined EFI Variable name input is a specific EFI Variable for verification. SetVariable( ) Service is a EFI specification defined Service that BIOS may provide. The SetVariable can be used to receive the authentication information from the OS. SetVariable( ) includes input parameters about EFI Variable's name and its data. Often, BIOS store the EFI Variable's data labeled as a pre-defined name into NVRAM. In some embodiments, SetVariable( ) Service can be modified and stored into NVRAM. A function call of the modified SetVariable( ) Service can be treated as sending the authentication information as illustrated in 220 of FIG. 2. Accordingly, the data in the input parameter will be treated as the authentication information for verification.

In some embodiments, the BIOS settings configurations may be obtained from any storage device such as a BMC, a hard disk drive (HDD), an Electrically Erasable Programmable Read-Only Memory (EEPROM), or a Non-Volatile Random-Access Memory (NVRAM) accessible by the computer system. In a related aspect, any of the BIOS settings configurations may be specified by a user.

Figure 3:
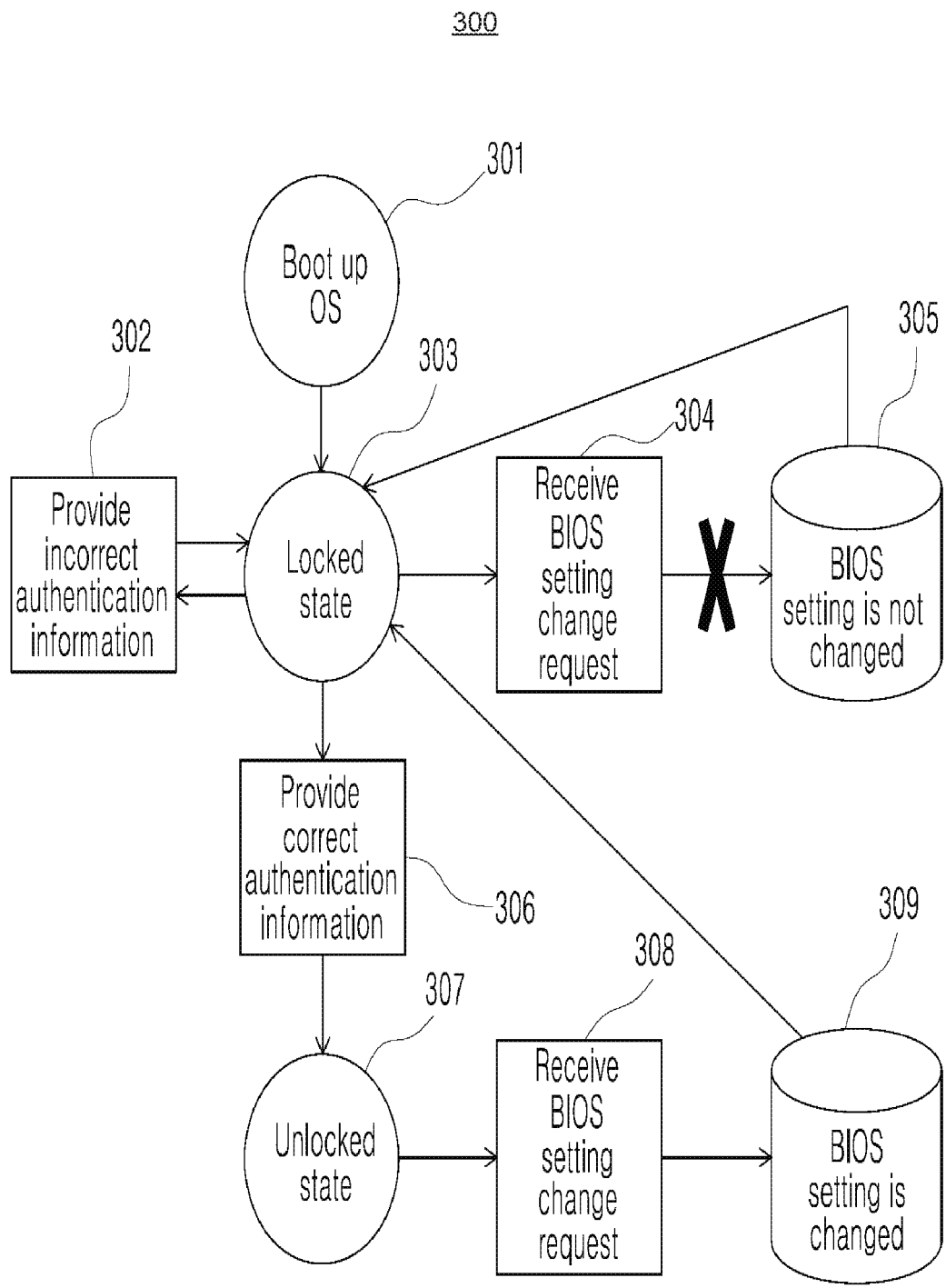
FIG. 3 illustrates a block diagram of an exemplary scenario of managing BIOS settings configurations for a computer system.

FIG. 3 illustrates a flow chart of diagram of steps in an exemplary method 300 for managing BIOS settings configurations for a computer system. The method 300 can start at step 301, a computer system is booted up to the Operating System. Contemporaneously with step 301, the BIOS settings are placed in a locked state at step 303. As noted above, the BIOS settings can be locked as default. Alternatively, the BIOS setting can be locked during the boot up process. From step 303, the method 300 can proceed to any of step 302, 304, or 306.

As noted above, the present disclosure contemplates that in order to grant access to the BIOS settings, correct authentication information needs to be provided so that the BIOS authentication mechanism can unlock the BIOS settings, as discussed above with respect to FIG. 2. Thus, step 302 illustrates that as long as incorrect authentication information is provided to the BIOS authentication mechanism, the BIOS settings will be maintained in the locked state 303 by the BIOS authentication mechanism.

Steps 304 and 305 illustrate the scenario where a computer system receives a BIOS settings change request without unlocking the BIOS settings. For example, such a scenario would be expected for malware attempting to make a BIOS settings change, as it would be unlikely that the malware would be able to unlock the BIOS settings. In this scenario, upon receiving the BIOS settings change request at step 304, the computer system will determine that the BIOS state is still in the locked state and BIOS settings changes will not be made at step 305. When it is determined that the changes will not be made, the computer system resumes previous processing and the BIOS settings remain locked in state at step 303.

Steps 306-309 illustrate the scenario when the BIOS authentication mechanism unlocks the BIOS settings prior or during an change request. First, as shown in FIG. 3, the correct authentication information is received at step 306. Upon determining that the received authentication information matches the stored authentication information, the BIOS status can be changed to the unlocked state 307. This process can be performed as described above with respect to FIG. 2.

As previously discussed, the authentication information can be any data to authenticate an authorized user as described above. The user can enter the authentication information using any input method. The BIOS authentication mechanism of the computer system will then retrieve the internal authentication information stored in the BIOS to make a determination. Upon determining that the received authentication information matches the stored authentication information, the BIOS status can be changed by the BIOS authentication mechanism to the unlocked state.

After or contemporaneously with steps 306 and 307, BIOS settings change request can be received 308. Thereafter, since the BIOS settings are in an unlocked state, the BIOS settings can be changed based on the change request at step 309. Once the BIOS settings change is made, the BIOS status can change back to the locked state 303 to prevent unauthorized processes from subsequently accessing and changing the BIOS settings.

Figure 4:
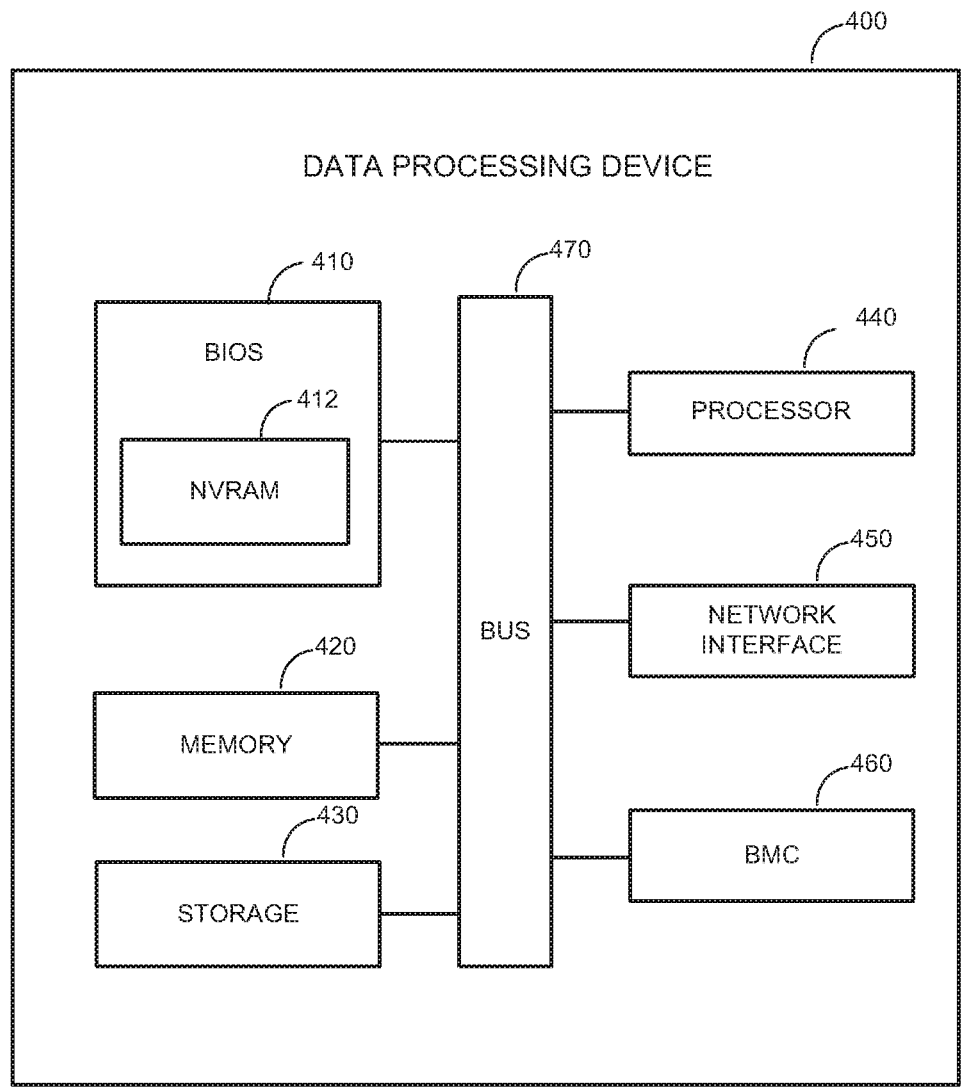
FIG. 4 illustrates a block diagram of an exemplary computer system.

FIG. 4 illustrates a block diagram of an exemplary computer system 400. The computer system 400 can include a processor 440, a network interface 450, a Baseboard Management Controller (BMC) 460, a memory 420, a storage 430, a BIOS 410, and a bus 470.

The computer system 400 can be, for example, a server (e.g., one of many rack servers in a data center) or a personal computer. The processor (e.g., central processing unit) 440 can retrieve and execute programming instructions stored in the memory 420 (e.g., random-access memory). The processor 440 can be a single CPU with a single processing core, a single CPU with multiple processing cores, or multiple CPUs. The storage 430 can include any form of non-volatile form of data storage such as a HDD or a flash drive. The bus 470 can transmit instructions and application data between computer components such as the processor 440, memory 420, storage 430, and networking interface 450.

The BIOS 410 can include a Basic Input/Output System or its successors or equivalents, such as an Extensible Firmware Interface (EFI) or Unified Extensible Firmware Interface (UEFI). The BIOS 410 can include a BIOS chip located on a motherboard of the computer system 400 storing a BIOS software program. The BIOS 410 can store firmware executed when the computer system is first powered on along with a set of configurations specified for the BIOS 410. The BIOS firmware and BIOS configurations can be stored in a non-volatile memory (e.g., NVRAM) 412 or a ROM.

The BIOS 410 can be loaded and executed as a sequence program each time the computer system 400 is started. The BIOS 410 can recognize, initialize, and test hardware present in a given computing system based on the set of configurations. The BIOS can address and allocate an area in the memory 420 in to store an operating system (OS). The BIOS 410 can then give control of the computer system to the OS.

The BIOS 410 of the computer system 400 can include a BIOS configuration that defines how the BIOS 410 controls various hardware components in the computer system 400. The BIOS configuration can determine the order in which the various hardware components in the computer system 400 are started. The BIOS 410 can provide an interface that allows a variety of different parameters to be set, which can be different from parameters in a BIOS default configuration. For example, a user (e.g., an administrator) can use the BIOS 410 to specify clock and bus speeds, specify what peripherals are attached to the computer system, specify monitoring of health (e.g., fan speeds and CPU temperature limits), and specify a variety of other parameters that affect overall performance and power usage of the computer system.

The BMC 460 can be a specialized microcontroller embedded on the motherboard of a computer, such as a server. The BMC 460 can manage the interface between system management software and platform hardware. Different types of sensors built into the computer system can report to the BMC 460 on parameters such as temperature, cooling fan speeds, power status, operating system (OS) status, etc. The BMC 460 can monitor the sensors and have the ability to send alerts to an administrator via the network interface 450 if any of the parameters do not stay within preset limits, indicating a potential failure of the system. The administrator can also remotely communicate with the BMC 460 to take some corrective action such as resetting or power cycling the system to restore functionality.

Rack servers can be used by different data centers with different computing needs. However, typical rack servers are preloaded with a single BIOS default configuration that may not be optimal for various needs of different customers. In addition, BIOS configurations for rack servers are often complicated and can be closely tied to hardware combinations in each rack server. Traditionally, the administrator needs a human-to-machine interface and an OS application to select the BIOS configurations for rack servers, which limits the initial configuration of the rack servers.

In an exemplary implementation, the computer system 400 can write the plurality of BIOS default configurations to the BIOS 410. In a related aspect, the BMC 460 can write the plurality of BIOS default configurations without the use of an OS. In another related aspect, an application running on an OS can write the plurality of BIOS default configurations. In an exemplary implementation, the BIOS 410 of the computer system 400 can select the particular BIOS default configuration. In an exemplary implementation, the BIOS 410 can load the particular BIOS default configuration into the NVRAM 412 of the BIOS 410.

In some embodiments, a rack of servers in a data center typically holds large number of rack servers. The rack servers can have different hardware configurations or can be used for different purposes. For example, some rack servers can have more HDDs, memory capacity, or CPU cores than others. In another example, certain rack servers can be used for cloud storage, thus requiring less processing power, while others can be used for serving online games, thus requiring more processing power. Therefore, the rack servers can require different BIOS default configurations that are optimized for the different hardware configurations and for the different functionalities of the rack servers. A user, such as an information technology (IT) developer, can prepare scripts that provide a different firmware setting (including e.g., BIOS default configurations) for different rack servers. Typically, the firmware settings are installed via an OS application. This means that the OS must be loaded on each rack server before the firmware settings can be installed.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but are to be accorded the widest scope consistent with the principles and novel features disclosed herein.

The invention claimed is:

1. A method for managing Basic Input/Output System (BIOS) settings in a computer system, the method comprising:
   upon booting up an operating system (OS) of the computer system, placing the BIOS settings in a locked state as a default;
   receiving, by a management controller of the computer system, an authentication request to change the BIOS setting status to the unlocked state out-of-band, the authentication request comprising received authentication information, wherein the OS of the computer system is inoperative during out-of-band;
   determining that the received authentication information matches stored authentication information while the BIOS is running in a System Management Mode (SMM);
   changing the BIOS setting status from the locked state to an unlocked state;
   receiving a change request to modify at least one of the BIOS settings; and
   modifying the BIOS settings based on the change request.

2. The method of claim 1, further comprising:
   receiving an authentication request to change the BIOS status to the unlocked state, the authentication request comprising received authentication information;
   determining that the received authentication information matches stored authentication information; and
   in response to determining that the received authentication information in the authentication request matches the stored authentication information, changing the BIOS status from the locked state to the unlocked state.

3. The method of claim 2, further comprising:
   determining that the received authentication information fails to match the stored authentication information; and
   in response to determining that the received authentication information in the authentication request fails to match the stored authentication information, maintaining the BIOS status in the locked state.

4. The method of claim 1, wherein the change request is a request generated by a process in an operating system of the computer system.

5. The method of claim 1, further comprising changing the BIOS status from the unlocked state to the locked state after modifying the BIOS based on the change request.

6. The method of claim 1, further comprising:
   detecting that the computer system is being powered-up; and in response to the detecting that the computer system is being powered-up, setting the BIOS state to a default state.

7. The method of claim 6, wherein a default state is the locked state.

8. The method of claim 2, further comprising:
detecting that the computer system is in a runtime state; and
in response to the detecting that the computer system is in the runtime state, configuring the BIOS to make the stored authentication information inaccessible.

9. A system configured for managing Basic Input/Output System (BIOS) settings, the system comprising:
a processor;
a non-transitory memory device including instructions, when executed by the processor, cause the processor to:
upon booting up an operating system (OS) of the system, place the BIOS settings in a locked state as a default;
receive, by a management controller of the system, an authentication request to change the BIOS setting status to the unlocked state out-of-band, the authentication request comprising received authentication information, wherein the OS of the system is inoperative during out-of-band;
determine that the received authentication information matches stored authentication information while the BIOS is running in a System Management Mode (SMM);
change the BIOS setting status from the locked state to an unlocked state;
receive a change request to modify at least one of the BIOS settings; and
modify the BIOS settings based on the change request.

10. The system of claim 9, wherein the instructions when executed, further cause the processor to:
receive an authentication request to change the BIOS status to the unlocked state, the authentication request comprising received authentication information;
determine that the received authentication information matches stored authentication information; and
in response to determining that the received authentication information in the authentication request matches the stored authentication information, change the BIOS status from the locked state to the unlocked state.

11. The system of claim 10, wherein the instructions when executed, further cause the processor to:
determine that the received authentication information fails to match the stored authentication information; and
in response to determining that the received authentication information in the authentication request fails to match the stored authentication information, maintain the BIOS status in the locked state.

12. The system of claim 9, wherein the instructions for managing BIOS settings are operated in a system management mode (SMM).

13. The system of claim 9, wherein information about the BIOS status are stored in a system management random access memory (SMRAM).

14. The system of claim 9, wherein the change request is a request generated by a process in an operating system of the system.

15. The system of claim 9, wherein the instructions when executed, further cause the processor to change the BIOS status from the unlocked state to the locked state after modifying the BIOS based on the change request.

16. The system of claim 9, wherein the instructions when executed, further cause the processor to:
detect that the system is being powered-up; and
in response to the detecting that the system is being powered-up, set the BIOS state to a default state.

17. The system of claim 16, wherein a default state is the locked state.

18. The system of claim 10, wherein the instructions when executed, further cause the processor to:
detect that the system is in a runtime state; and
in response to the detecting that the system is in the runtime state, configure the BIOS to make the stored authentication information inaccessible.

19. A non-transitory computer-readable medium storing executable instructions for managing Basic Input/Output System (BIOS) settings which cause a data processing device to:
upon booting up an operating system (OS) of a computer system, place the BIOS settings in a locked state as a default;
receive, by a management controller of the computer system, an authentication request to change the BIOS setting status to the unlocked state out-of-band, the authentication request comprising received authentication information, wherein the OS of the computer system is inoperative during out-of-band;
determine that the received authentication information matches stored authentication information while the BIOS is running in a System Management Mode (SMM);
change the BIOS setting status from the locked state to an unlocked state;
receive a change request to modify at least one of the BIOS settings; and
modify the BIOS settings based on the change request.

20. The non-transitory computer-readable medium of claim 19, wherein the executable instructions further cause the data processing device to:
receive an authentication request to change the BIOS status to the unlocked state, the authentication request comprising received authentication information;
determine that the received authentication information matches stored authentication information; and
in response to determining that the received authentication information in the authentication request matches the stored authentication information, change the BIOS status from the locked state to the unlocked state.

* * * * *